March 4, 1969 M. L. GREENBERG ET AL 3,430,318

MACHINE TOOLS AND INSTRUMENTS

Filed March 10, 1967

INVENTORS
GORDON H. PORATH &
MYRON L. GREENBERG
BY
Barnes, Kisselle, Raisch & Choate
ATTORNEYS March 4, 1969 M. L. GREENBERG ET AL 3,430,318
MACHINE TOOLS AND INSTRUMENTS
Filed March 10, 1967 Sheet 2 of 4

INVENTORS
GORDON H. PORATH &
MYRON L. GREENBERG
BY
Barnes, Kisselle, Raisch & Choate
ATTORNEYS

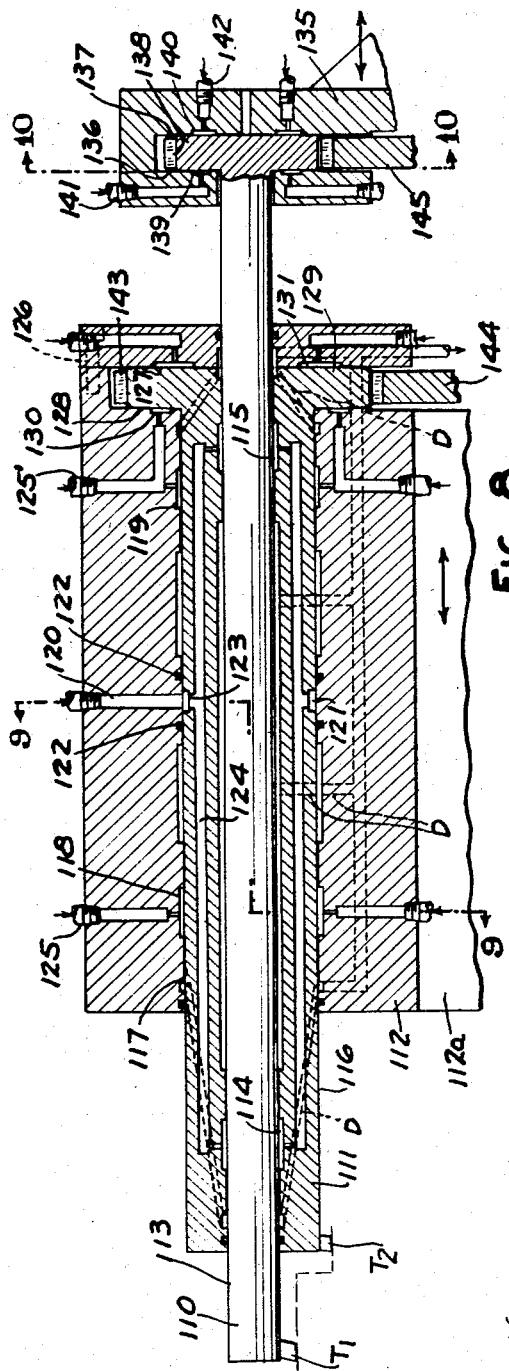

March 4, 1969  M. L. GREENBERG ET AL  3,430,318
MACHINE TOOLS AND INSTRUMENTS
Filed March 10, 1967  Sheet 4 of 4

INVENTORS
GORDON H. PORATH &
MYRON L. GREENBERG
BY
Barnes, Kisselle, Raisch & Choate
ATTORNEYS 3,430,318
MACHINE TOOLS AND INSTRUMENTS
Myron L. Greenberg, Union Lake, and Gordon H. Porath, Detroit, Mich., assignors to The Babcock & Wilcox Company, New York, N.Y., a corporation of New Jersey
Filed Mar. 10, 1967, Ser. No. 622,228
U.S. Cl. 29—27                          21 Claims
Int. Cl. B23b 7/00, 9/00

ABSTRACT OF THE DISCLOSURE

The machine tool and instrument disclosed herein comprises three coaxial members adapted to rotate relative to one another about a common axis. At least two of the members are adapted to support work engaging tools or instruments. The first and second members have complementary annular surfaces as do the second and third members and at least some portions of these surfaces extend in the direction other than axially. A plurality of circumferentially spaced pads are provided on each set of said complementary surfaces and a restrictor is associated with each pad. Fluid is supplied under pressure to each pad to its respective restrictor and flows continuously between the surfaces so that forces on the members are balanced by pressure in the pads providing a separation of the surfaces and retain the members in predetermined radial position relative to one another and in accurate, stable relation to one another.

---

This invention relates to machine tools and instruments utilizing radially spaced tools or work engaging members.

Background of the invention

In machine tools and instruments, it is often necessary to support two or more tools or work engaging members in stable, accurate and radially spaced relation to one another. For example, in machine tools where dual or multiple concentric operations are performed at a single station such as in a transfer line, dial index machine, trunnion machine or boring machine, various simultaneous machining operations can be performed such as simultaneously making two concentric bores, a bore and spotface or chamfer, or trepanning. In such operations, although it is necessary to accurately perform the operations concentrically, because of the difference in diameters and nature of the operations, they must be done at different rotational speeds resulting in varying load requirements so that it is very difficult to obtain the desired accuracy. It has been heretofore suggested that one bore or opening be made and then that bore be used as a pilot in a successive machining operation. This has the disadvantage in that the first formed bore is subject to damage from chips, wear and similar influences.

Among the objects of the invention are to provide machine tools and instruments comprising at least three relatively movable components two of which support tools or work engaging members wherein there is no metal-to-metal contact between the components, wear is substantially eliminated, and the components are maintained in accurate stable frictionless relation to one another under all loads, both during rotation and when they are stationary; wherein simultaneous machining or inspecting by two or more tools or work engaging members on different radii or at axially separated locations or both can be made simultaneously about a common center; wherein one tool or work engaging member can be operated at a different rotational speed than the other; wherein the tool or work engaging members can be operated simultaneously or alternatively.

More specifically, it is a further object of the invention to provide an apparatus wherein it is possible to tram several concentric regions, somewhat separated in location either on different radii or at axially spaced locations, or both, without the need for setting up separate gauge spindles.

It is a further object of the invention to provide an apparatus which will permit very accurate testing of precision equipment such as gyroscopes or inertial or aided inertial systems by orbiting one portion of a device such as a stable platform accurately and concentrically with respect to one or more other portions of the device such as transducers, reference elements and the like.

It is a further object of the invention to provide an apparatus which will permit very high speed operations of a small inner shaft while only exposing its bearings to a fluid film at a portion of the total rotational speed so that quite high speeds can be obtained without special precautions due to heat generation, half-frequency whirl and similar problems relating to high speeds.

It is a further object of the invention to provide an apparatus which will permit the use of interchangeable tooling so that heavy cuts can be taken at moderate speed or light cuts at high speed and no turret or separate heads are required, but on the contrary, the rough and light cuts can be taken on the same apparatus merely by changing from outer to inner tool holders.

It is a final object of the invention to provide a means by which either the inner member may be rotated at a different speed than the outer member or fed axially at a different speed than the outer member or both, while maintaining all working parts separated by an accurate, stable, frictionless film of lubricant.

Summary

The machine tool and instrument disclosed herein comprises three coaxial members adapted to rotate relative to one another about a common axis. At least two of the members are adapted to support work engaging tools or instruments. The first and second members have complementary annular surfaces as do the second and third members and at least some portions of these surfaces extend in the direction other than axially. A plurality of circumferentially spaced pads are provided on each set of said complementary surfaces and a restrictor is associated with each pad. Fluid is supplied under pressure to each pad to its respective restrictor and flows continuously between the surfaces so that forces on the members are balanced by pressure in the pads providing a separation of the surfaces and retain the members in predetermined radial position relative to one another and in accurate, stable relation to one another.

Description of the drawings

FIG. 8 is a fragmentary longitudinal sectional view through a further modified form of the apparatus.

FIG. 9 is a fragmentary sectional view taken along the line 9—9 in FIG. 8.

FIG. 10 is a fragmentary view taken along the line 10—10 in FIG. 8, parts being broken away.

*Description*

Figure 1:
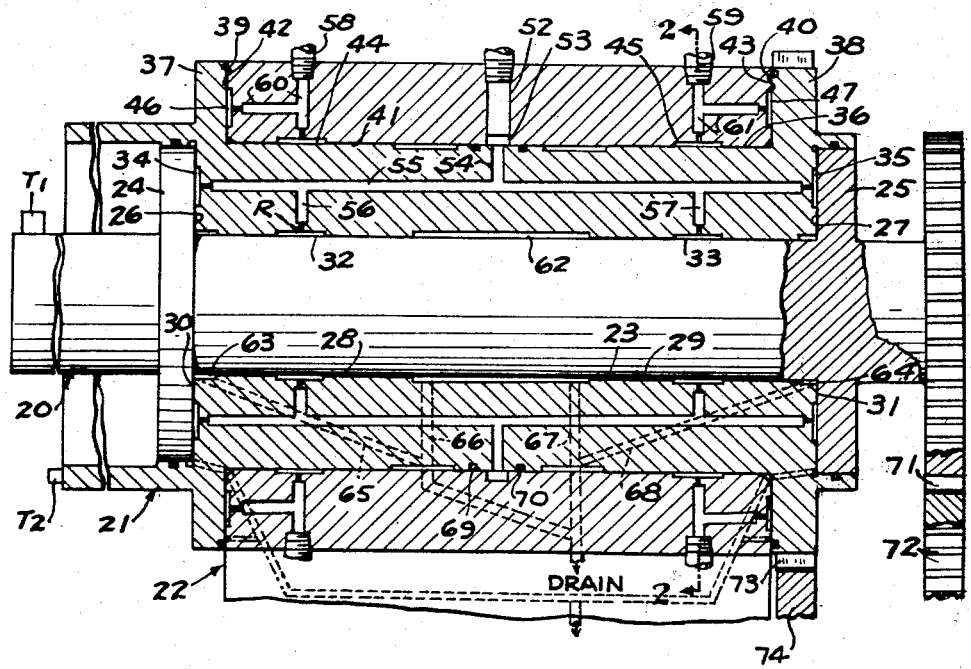
FIG. 1 is a part sectional longitudinal view through a bearing embodying the invention.

Referring to FIG. 1, the invention is shown in connection with a machine tool wherein at least three members are adapted to move relative to one another and two of the members support tools $T_1$, $T_2$. Specifically, the apparatus includes an inner mmeber 20, an intermediate member 21 and an outer member 22, the latter being shown as fixed on a base.

The members 20, 21 and 22 are mounted for rotation about a common axis and have complementary surfaces as presently described. Specifically, the inner member 20 includes a generally cylindrical outer surface 23 and spaced radial flanges 24, 25 that define inwardly facing radial surfaces 26, 27. The intermediate member 21 includes cylindrical surface portions 28, 29 which are complementary to the cylindrical surface 23 and radial surfaces 30, 31 which are complementary to the radial surfaces 26, 27, respectively.

A plurality of circumferentially spaced pressure pockets or pads 32, 33, 34 and 35 are provided on the surfaces 28, 29, 30 and 31, respectively.

The intermediate member, in turn, includes a cylindrical outer surface 36 and flanges 37, 38 defining inwardly facing radial surfaces 39, 40. The outer member 22 includes a complementary cylindrical surface 41 and complementary radial surfaces 42, 43. Circumferentially spaced pressure pockets or pads 44, 45 are provided in the surface 41 and pressure pads 46, 47 are provided in the radial surfaces 42, 43.

Figure 2:
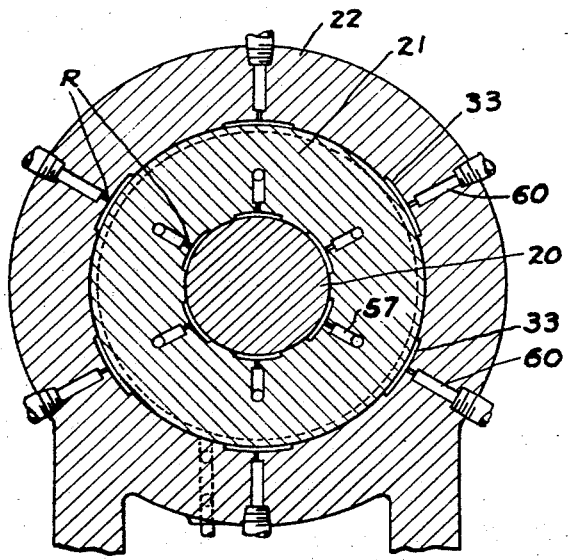
FIG. 2 is a fragmentary sectional view taken along the line 2—2 in FIG. 1.
Figure 3:
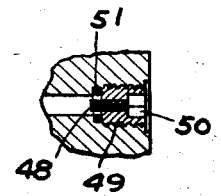
FIG. 3 is a fragmentary sectional view on an enlarged scale showing a portion of the apparatus in FIG. 2.
Figure 4:
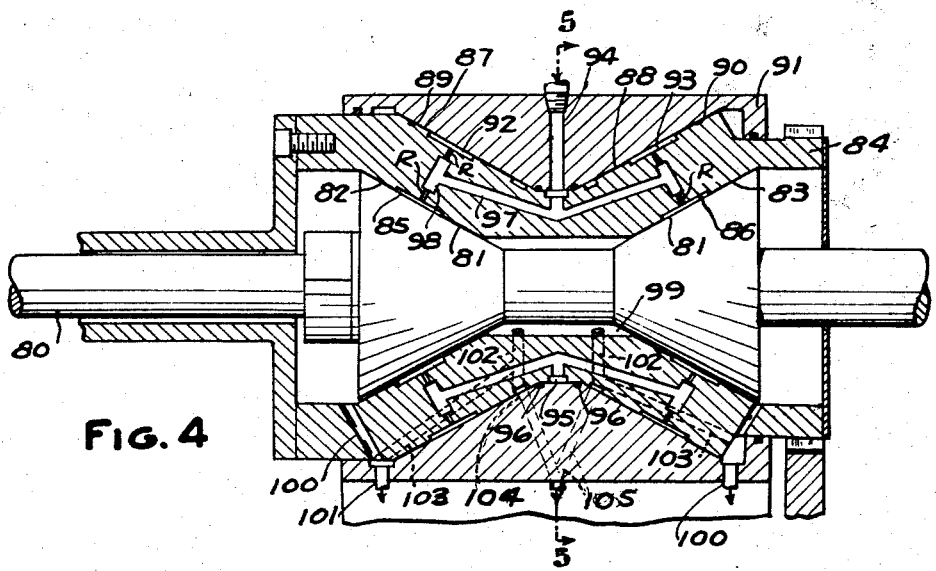
FIG. 4 is a fragmentary longitudinal sectional view through a modified form of the invention.
Figure 5:
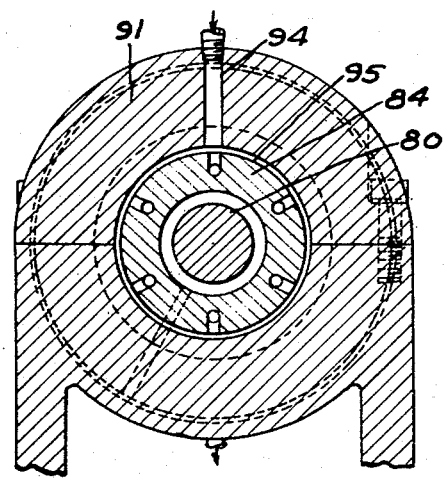
FIG. 5 is a fragmentary sectional view taken along the line 5—5 in FIG. 4.
Figure 7:
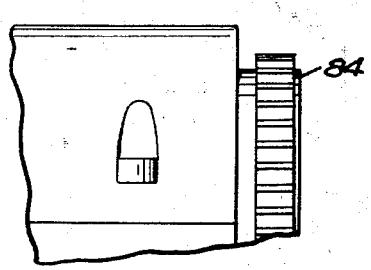
FIG. 7 is a fragmentary side elevational view of the apparatus shown in FIG. 4.
Figure 6:
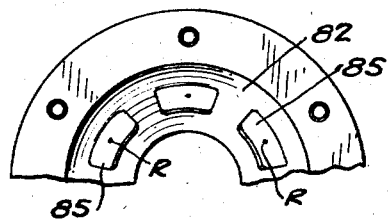
FIG. 6 is a fragmentary end view of the apparatus shown in FIG. 4, parts being broken away.

A restrictor R, shown diagrammatically in FIGS. 1 and 2, is associated with each pressure pad and functions to reduce the pressure of fluid and provides substantially constant pressure to each of the pressure pads. As shown in FIG. 3, each restrictor R comprises a capillary tube 48 fixed in a set screw 49 that is threaded into an opening in the base of each pressure pad. The end of the screw may include an Allen head depression 50 for engagement of a tool. An O-ring 51 provides a seal. Orifices or flow control valves may be used instead of capillary tubes, although they are more cumbersome.

Fluid under pressure is supplied to the outer member 22 through a radial inlet 52 to an annular groove 53 in the surface 41. The fluid then flows radially inwardly through radial passages 54 in the intermediate member 21 to longitudinal passages 55 that extend to the pressure pads 34, 35. Secondary radial passages 56, 57 extend from the axial passages 55 to the pressure pads 32, 33. Fluid under pressure is also supplied through secondary inlets 58, 59 and secondary passages 60, 61 to the pressure pads 44, 45 and 46, 47.

In this fashion, fluid is supplied under pressure through each restrictor to the pressure pads. The size of the restrictors is controlled so that the pressure in each circumferentially spaced series of pressure pads is substantially constant.

The fluid which may be used may consist of either hydraulic fluid such as oil or gas such as air. In the case of gaseous fluid, the apparatus is only capable of use under light load and it is essential that the restrictors be positioned in close proximity to the pressure pads. Best results are achieved in machine use when a viscous liquid such as machine oil is provided. For very high speed applications, a gas is more suitable.

If a liquid is used, then drain passages are needed for collection and reuse. If a gas is used, vent passages and atmosphere are provided. As shown in FIG. 1, where a liquid is used, the drain passages may comprise an annular drain groove 62 in the surface 29 to which the fluid flows axially from the pressure pads 32, 33, and peripheral grooves 63, 64 in the surface 29 to which the fluid flows axially outwardly from the pressure pads 32, 33 and radially inwardly from the pressure pads 34, 35. Drain passages 65, 66, 67 and 68 extend from these grooves 62, 63, 64 to a common external drain. In the case of the pressure pads 44, 45, 46 and 47, the fluid can flow outwardly to the periphery of the machine and thence be collected. Seals are provided to avoid leakage. As shown in FIG. 1, it is preferable to provide a seal in the form of O-rings 69, 70 in annular seats to isolate the supply groove 53 from the fluid flowing out of the pressure pads. A close fitting capillary leakage seal is also satisfactory.

When fluid under pressure is supplied to each pressure pad, the fluid flows in a thin film between the complementary surfaces and maintains the members in stable accurate frictionless relation to one another. Any tendency of forces on the members to move one member relative to another is opposed by the pressure forces in the pressure pads. Thus, for example as shown in FIG. 1, any force tending to move one of the members radially relative to another causes an increase in pressure in certain of the pressure pads and a corresponding decrease in pressure in the diametrically opposed pads producing a net force that tends to return the membres to their original position. Similarly, any force tending to move one of the members axially relative to the other is opposed by the pressure forces in the pressure pads on the radial surfaces.

When fluid is being supplied to the pressure pads, the members not only are free to rotate relative to one another but are free to rotate at different speeds. Thus, as shown in FIG. 1, the inner member 20 is formed with a gear 71 on the periphery of the flange 25 that meshes with a drive gear 72. Similarly, the flange 38 of the outer intermediate member is formed with a gear 73 that meshes with a drive gear 74 driven at a different speed and from a different power source. Other means for driving can be used such as belting, splines, direct couplings or the like.

In use, the tools on the inner member 20 and the intermediate member 21 can be rotated independently of one another at different speeds. Instead of utilizing tools on the members 20, 21, work engaging devices such as sensing devices can be mounted thereon for engaging or otherwise inspecting a workpiece that has two concentric surfaces.

In the form of the invention shown in FIGS. 4–7, the three members have complementary frusto-conical surfaces that provide for both radial and axial support of one member relative to the other. Specifically, the inner member 80 includes oppositely facing frusto-conical surfaces 81 that are complementary to frusto-conical surfaces 82, 83 of intermediate member 84. Each of the surfaces 82, 83 is formed with an annular series of circumferentially spaced pressure pockets or pads 85, 86 each of which has a restrictor R associated therewith. The intermediate member 84 is in turn formed with opposed frusto-conical surfaces 87, 88 that are complementary to frusto-conical surfaces 89, 90 of outer member 91. An annular series of pressure pockets 92, 93 and associated restrictors R are provided in the surfaces 87, 88. In order to facilitate assembly, the inner member 80 may be made of several components which are bolted together and the outer member 91 likewise.

Fluid under pressure is provided through a radial inlet 94 in the outer member 91 to an annular groove 95 that is isolated from the surfaces by O-rings 96. The fluid flows through generally axial passages 97 to cross-passages 98 and in turn to the pressure pads. If the fluid is liquid, a central drain groove 99 and peripheral drain passages 100, 104 are provided which extend to common drain openings 101 through interconnecting passages 102, 103, 105.

As in the previous form of the invention, when fluid is supplied under pressure to the pressure pads, a film of liquid flows continuously from the pressure pads between the complementary surfaces and maintains the members in stable accurate frictionless relation to one another.

The coaxial hydrostatic bearing embodying the invention is adapted for use with machine tools and accurate instrumentation where the loads may vary. It can be appreciated that the apparatus, particularly when used in connection with a liquid fluid, is not subject to being affected by varying loads so that the same apparatus can be used for both rough and finish work.

In the form of the invention shown in FIGS. 8–10, the invention is shown as embodied as part of a machine tool wherein two portions of a common bore are being simultaneously machined. Thus, the invention comprises an inner member 110 such as a boring bar having a tool $T_1$ thereon, an intermediate member 111 having a tool $T_2$ thereon and an outer member mounted on a base 112a or integral with the base. The assembly consisting of the base, housing 112 and intermediate member 111 are movable axially independently of the inner member 110. By this arrangement, as will be more fully described hereinafter, the tools $T_1$, $T_2$ can be rotated at different speeds so that the optimum peripheral or surface cutting speed, which may or may not be the same, is achieved for each tool.

As shown in FIG. 8, the outer surface 113 of the inner member 110 is cylindrical and the intermediate member 111 has a complementary opening with cylindrical surface portions with at least two sets of circumferentially spaced pressure pads 114, 115 therein. The outer surface 116 of the intermediate member 111 is also cylindrical and extends through an opening 117 in the outer member 112 that has complementary cylindrical portions in which at least two sets of circumferentially spaced pressure pads 118, 119 are provided. Each pressure pad has a restricter R associated therewith as in the previous forms of the invention. Fluid under pressure is provided through a radial inlet passage 120 in the outer member 112 to an annular groove 121 that may be isolated by O-rings 122 and thereafter through radial passages 123 to axial passages 124 that supply the pads 114, 115. Separate radial passages 125 extend to the pads 118, 119. The outer member 117 includes a spaced end plate 126 that has a radial surface 127 spaced from a radial surface 128 on the outer member 112. The intermediate member includes a flange 129 that extends between the surfaces 127, 128. Pressure pads 130, 131 are provided in the surfaces 128, 127 respectively and fluid under pressure is supplied to these pads through appropriate radial inlets 125′ and 126. Where the fluid being supplied is a liquid, the appropriate drain passages identified as D are provided.

As further shown in FIG. 8, if the inner member linear actuator is non-rotating, the inner member 110 is supported at one end in a slide 135 that has opposed radial faces 136, 137 between which the radial faces of a gear 138 extend. Pressure pads 139, 140 are provided in the surfaces 136, 137 and fluid is supplied thereto through passages 141, 142.

A gear 143 is provided on a peripheral flange 129 of the intermediate member and is adapted to be driven by a gear 144 on the base 112. The gear 138 is driven by a gear 145 on a drive unit mounted on the slide 135 or by a spline from a drive unit on the base 112. Seals are provided throughout, but are not shown.

Thus when fluid under pressure is supplied to each of the pressure pads, the intermediate members 110, 113 are maintained in stable relation to one another both axially and radially. The inner member 110 supporting the tool $T_1$ can be rotated independently of the other members by rotation of the gear 145. The intermediate member 111 supporting the tool $T_2$ can be rotated independently by rotating the gear 144. Each of the members 110, 111 can be translated axially independently of one another. In this fashion it is possible for the tools $T_1$ and $T_2$ to be rotated at different rotational speeds but at the same peripheral speeds and to be translated at different speeds as may be desired. The gears may be splines to allow fixed drives with axially movable engagement.

Figure 11:
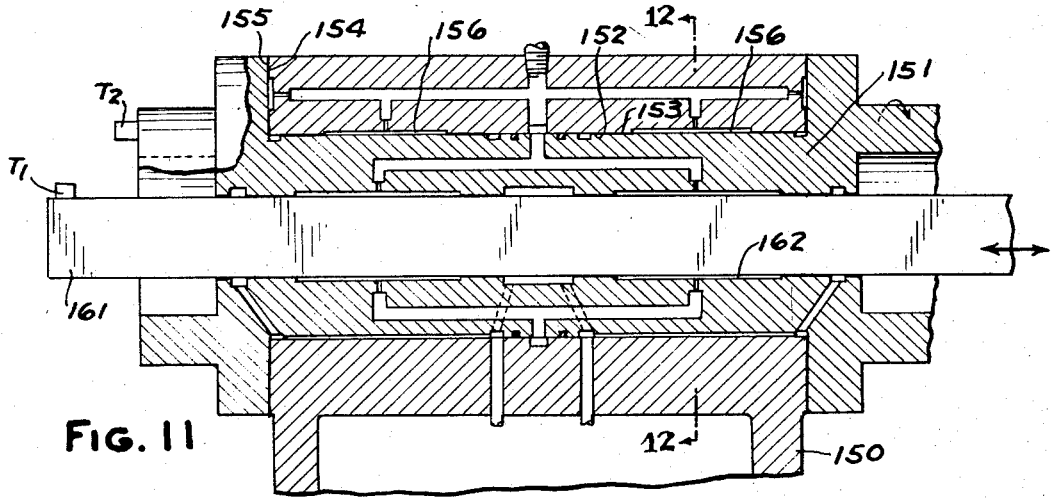
FIG. 11 is a longitudinal sectional view through a further modified form of the apparatus taken along the line 11—11 in FIG. 12.
Figure 12:
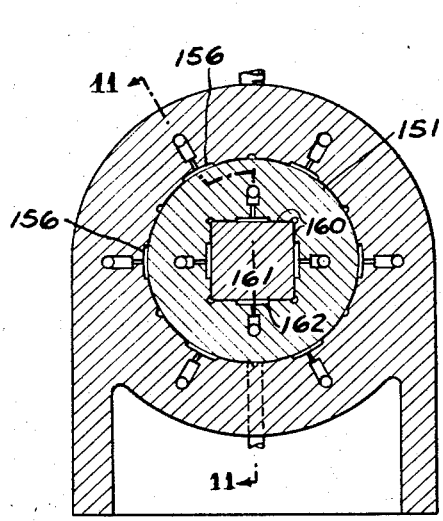
FIG. 12 is a sectional view taken along the line 12—12 in FIG. 11.
Figure 13:
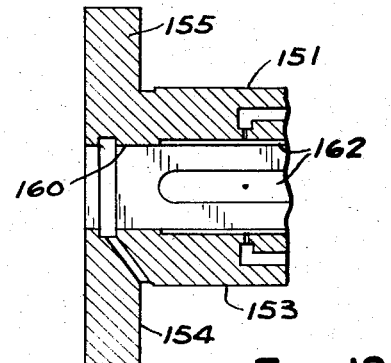
FIG. 13 is a fragmentary sectional view of a portion of the apparatus shown in FIG. 11.

In the form of the invention shown in FIGS. 11–13, the inner member is not rotatable relative to the intermediate member but is only movable axially thereof. Specifically, this form of apparatus comprises a base 150 in which an intermediate member 151 is rotatably mounted. The complementary surfaces 152, 153 and 154, 155 are provided with circumferentially spaced pressure pads 156 in the manner similar to the form of the invention shown in FIGS. 1–3. The intermediate member 151 is provided with a non-circular opening 160 in which the inner member 161 is mounted for reciprocating movement. The surfaces of the opening 160 are provided with circumferentially spaced pressure pads 162 to which fluid is supplied through restrictors in the same manner as the pressure pads in FIGS. 1–3. Intermediate member 151 and inner member 161 support tools $T_1$ and $T_2$. Tool $T_1$ is thus movable axially relative to the tool $T_2$ and rotates with the tool $T_2$.

We claim:
1. In a machine tool or instrument and the like, the combination comprising
at least three coaxial members adapted to be rotated relative to one another about a common axis,
at least two of said members being adapted to support work engaging members,
the first and second of said members having complementary annular surfaces,
the second and third of said members having complementary annular surfaces,
at least some portions of said surfaces extending other than axially of said members.
a plurality of circumferentially spaced pads on one of each set of said complementary surfaces,
a restrictor associated with each said pad,
and means for supplying fluid under pressure to each said pad through its respective restrictor,
the relative dimensions of said members being such that a pressurized film of fluid flows continuously between the surfaces through the pressure pads so that forces on the member are balanced by pressure in the pads providing a separation of the surfaces and retaining the members in predetermined radial position relative to one another and in accurate stable frictionless relation to one another.

2. The combination set forth in claim 1 wherein said annular surfaces comprise at least one axially extending cylindrical surface and at least two spaced radially extending surfaces between each of said members,
and an annular series of circumferentially spaced pressure pads being provided adjacent each said complementary axial and radial surfaces.

3. The combination set forth in claim 2 wherein said radially extending surfaces are on a single flange on the respective members.

4. The combination set forth in claim 1 wherein said fluid comprises liquid,
said members having drain passages therein through which fluid passes after passing through said pressure pads and between said surfaces.

5. The combination set forth in claim 1 wherein said annular surfaces comprise two longitudinally spaced oppositely disposed frusto-conical surfaces on each of said members.

6. The combination set forth in claim 1 wherein said pressure pads are provided on said intermediate member.

7. The combination set forth in claim 1 wherein said means for supplying fluid to said pads comprises interconnecting passages in said intermediate member.

8. In a machine tool or instrument and the like, the combination comprising
a first inner member having an external surface,
a second intermediate member having an opening therethrough with surface portions complementary to the external surface of said first member,
at least two sets of circumferentially spaced pressure pads in said surface portions of said intermediate member,
a third outer member,
said intermediate and outer members having complementary surfaces,
at least some of said surfaces being other than axial,
at least two sets of circumferentially spaced pressure pads on one of said complementary surfaces of said intermediate and outer members,
a restrictor associated with each said pressure pad,
means for rotating said intermediate member relative to said outer member,
means for moving said inner member axially independently of said intermediate and outer members,
a tool on said intermediate member,
a tool on said inner member,
and means for supplying fluid under pressure to each of said pressure pads through said restrictors,
the relative dimensions of said surfaces being such that a pressurized film of fluid flows continuously through the pressure pads between the surfaces so that the forces on said members are balanced by pressures in the pads thereby providing a permanent separation of the surfaces and retaining the members in accurate, radially stable frictionless relation to one another while permitting the inner members to move axially independently of the intermediate and outer members while the intermediate and outer members are maintained in accurate axially stable frictionless relation to one another.

9. The combination set forth in claim 8 wherein said annular surfaces between said intermediate and outer member include at least two axially extending cylindrical surfaces and at least two radially extending surfaces.

10. The combination set forth in claim 9 wherein said radially extending surfaces are on a single flange of a member.

11. The combination set forth in claim 8 wherein said pressure pads are provided on said intermediate member between said inner member and intermediate member and on said outer member in the surfaces between the outer member and the intermediate member.

12. The combination set forth in claim 8 wherein said external surface of said inner member is cylindrical.

13. The combination set forth in claim 8 wherein said external surface of said inner member is non-circular.

14. The combination set forth in claim 8 wherein said inner member is rotatable relative to said intermediate member.

15. In a machine tool or instrument and the like, the combination comprising
at least three coaxial members,
at least two of said members being adapted to be rotated relative to one another about a common axis,
at least two of said members being adapted to support work engaging members,
a first and second of said members having complementary annular surfaces,
a second and third of said members having complementary annular surfaces,
at least one set of said annular surfaces comprising at least one axially extending cylindrical surface and at least two spaced radially extending surfaces between each of said members,
a plurality of circumferentially spaced pads on said complementary surfaces of two of said members,
a restrictor associated with each said pad,
and means for supplying fluid under pressure to each said pad through its respective restrictor,
the relative dimensions of said members being such that a pressurized film of fluid flows continuously between the surfaces through the pressure pads so that forces on the member are balanced by pressure in the pads providing a separation of the surfaces and retaining the members in predetermined radial position relative to one another and in accurate stable frictionless relation to one another.

16. The combination set forth in claim 15 wherein said fluid comprises liquid,
said members having drain passages therein through which fluid passes after passing through said pressure pads and between said surfaces.

17. In a machine tool or instrument and the like, the combination comprising
at least three coaxial members adapted to be rotated relative to one another about a common axis,
at least two of said members being adapted to support work engaging members,
a first and second of said members having complementary annular surfaces,
a second and third of said members having complementary annular surfaces,
said annular surfaces comprising two longitudinally spaced oppositely disposed frusto-conical surfaces on each of said members,
a plurality of circumferentially spaced pads on one of said complementary surfaces of two of said members,
a restrictor associated with each said pad,
and means for supplying fluid under pressure to each said pad through its respective restrictor,
the relative dimensions of said members being such that a pressurized film of fluid flows continuously between the surfaces through the pressure pads so that forces on the member are balanced by pressure in the pads providing a separation of the surfaces and retaining the members in predetermined radial position relative to one another and in accurate stable frictionless relation to one another.

18. In a machine tool or instrument and the like, the combination comprising
a first inner member having an external surface,
a second intermediate member having an opening therethrough with surface portions complementary to the external surface of said first member,
at least two sets of circumferentially spaced pressure pads in said surface portions of said intermediate member,
a third outer member,
said intermediate and outer members having complementary surfaces,
at least some of said surfaces being other than axial,
at least two sets of circumferentially spaced pressure pads on one of said complementary surfaces of said intermediate and outer members,
a restrictor associated with each said pressure pad,
a tool on said intermediate member,
a tool on said inner member,
and means for supplying fluid under pressure to each of said pressure pads through said restrictors,
the relative dimensions of said surfaces being such that a pressurized film of fluid flows continuously through the pressure pads between the surfaces so that the forces on said members are balanced by pressures in the pads thereby providing a permanent separation of the surfaces and retaining the members in accurate, radially stable frictionless relation to one another while permitting the inner members to move axially independently of the intermediate and outer members while the intermediate and outer members are maintained in accurate axially stable frictionless relation to one another.

19. The combination set forth in claim 18 wherein two of said members are rotatable relative to the third member.

20. The combination set forth in claim 18 wherein one of said members is movable axially relative to the others.

21. The combination set forth in claim 20 wherein said one member is also rotatable relative to at least one of said other members.

References Cited

UNITED STATES PATENTS 3,267,550  8/1966  Whittum _____ 29—27

RICHARD H. EANES, JR., *Primary Examiner.*